United States Patent [19]
Cuschera

[11] 3,896,511
[45] July 29, 1975

[54] SELF-CAULKING DRAIN

[76] Inventor: Casper Cuschera, 31650 Medinah St., Hayward, Calif. 94544

[22] Filed: Oct. 17, 1973

[21] Appl. No.: 407,305

[52] U.S. Cl. .......................................... 4/288; 4/288
[51] Int. Cl. ............................................... E03c 1/26
[58] Field of Search ....... 4/288, 146, 286, 287, 191; 277/117, 119; 285/56-60

[56] References Cited
UNITED STATES PATENTS

| | | | |
|---|---|---|---|
| 1,844,409 | 2/1932 | Rypinski | 277/177 |
| 2,935,349 | 5/1960 | Burch | 277/190 |
| 3,668,718 | 6/1972 | Cuschera | 4/288 |

Primary Examiner—Robert I. Smith

[57] ABSTRACT

A drain for showers or the like which eliminates the need for conventional caulking materials includes a hollow cyindrical fitting with a flanged lower opening which receives a waste water pipe. Disposed within the fitting and exterior to the portion of waste water pipe received therein is a resilient gasket which has a plurality of spaced annular ribs adjacent the water pipe. The gasket includes an annular groove in its top surface which receives a split snap ring. The snap ring, which is retained by an annular groove in the interior surface of the fitting, causes the gasket to expand and form a tight seal between the waste pipe and the fitting, preventing any waste water leakage.

3 Claims, 7 Drawing Figures

PATENTED JUL 29 1975　　　　　　　　　　　　　　3,896,511
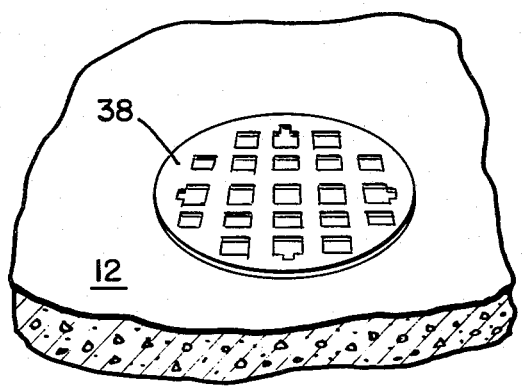
FIG_1
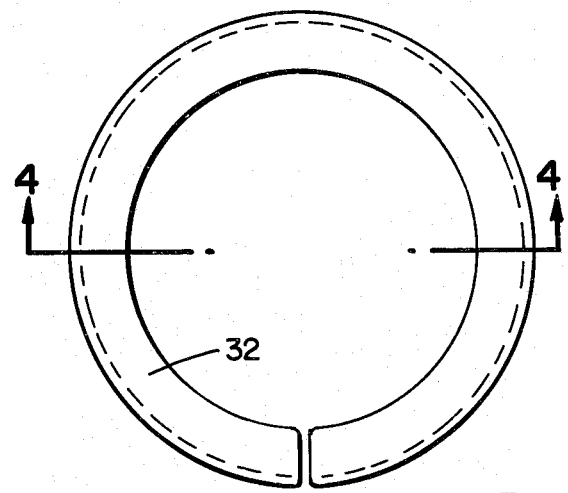
FIG_3
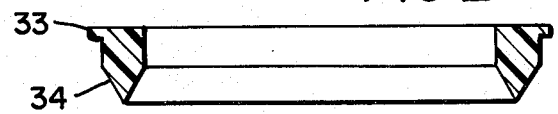
FIG_4
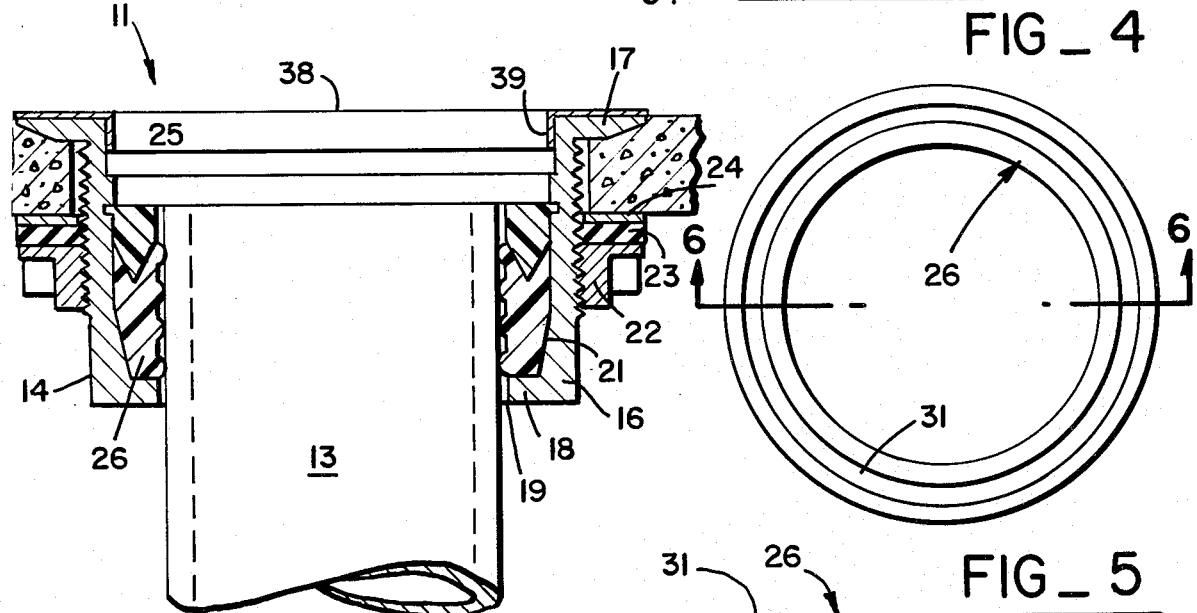
FIG_2
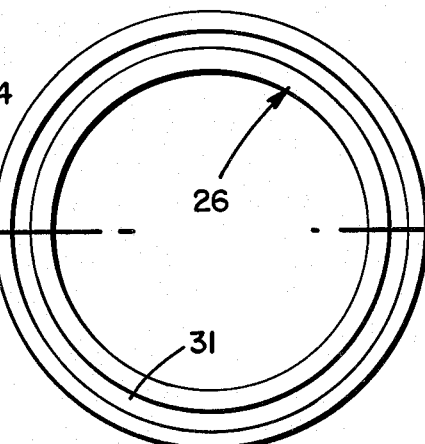
FIG_5
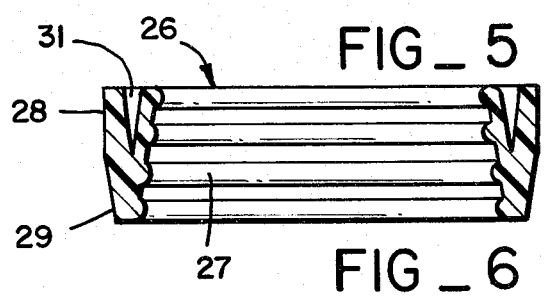
FIG_6
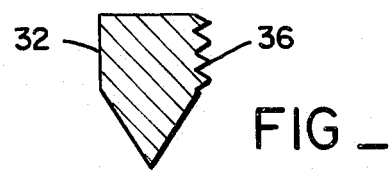
FIG_7

SELF-CAULKING DRAIN

BACKGROUND OF THE INVENTION

In the installation of drains in prefabricated shower receptors and the like, it is a commonly practiced procedure to secure the drain fitting to an opening in the receptor and in alignment with the drain pipe. In order to ensure an effective seal between the drain fitting and the drain pipe, the services of a skilled plumber have been required to caulk the joint with molten lead or other caulking material. This procedure has been both time-consuming and expensive, and is often beyond the means or expertise of a do-it-yourself homeowner.

In accordance with the disclosure of the present invention, the caulking procedure is eliminated, and an effective seal is provided with the use of a novel gasket and an expander ring which cooperate with the drain fitting and drain pipe to provide a leak-proof drain.

Although the invention will be described in relation to shower drains for prefabricated receptors, it may be appreciated that the present invention may be employed in any situation where conventional practice has used caulking material to effect a seal between a pipe and a fitting, such as toilet drains, pipe joints, and the like.

THE DRAWING

FIG. 1 is a perspective view of a portion of a shower receptor equipped with the drain fitting of the present invention;

FIG. 2 is a vertical cross-sectional view of the drain fitting of the present invention;

FIG. 3 is a top view of the expander ring portion of the present invention;

FIG. 4 is a cross-sectional view taken along line 4—4 of FIG. 3;

FIG. 5 is a top view of the gasket portion of the present invention;

FIG. 6 is a cross-sectional view taken along line 6—6 of FIG. 5;

FIG. 7 is a cross-sectional view of an alternative embodiment of the present invention.

DESCRIPTION OF THE PREFERRED EMBODIMENT

In general terms, the self-caulking drain of the present invention is adapted for use in an opening 11 provided in the base of a shower receptor 12 and in alignment with a discharge pipe 13. It is essential that the waste water collected by the receptor be guided into the upper open end of the discharge pipe 13 without any leakage whatsoever.

The self-caulking drain includes a fitting 14 which is inserted in the opening 11. The fitting 14, which is commonly termed a drain, comprises a generally cylindrical body 16 with an outwardly directed peripheral flange 17 which engages the receptor 12 adjacent to the opening 11. The lower surface of the flange is bevelled to accommodate the configuration of the receptor. The lower end of the body 16 includes a radially, centrally directed flange 18, which defines an opening 19 through which the upper end of the pipe 13 is received. The inner bore of the body 16 is tapered in the portion 21 adjacent to the flange 18, forming a tapered, annular cavity between the inner bore of the fitting and the exterior surface of the pipe 13. The inner bore also is provided with an annular groove 25.

The exterior of the fitting 14 includes a threaded portion, the threads being engaged by a nut 22. By placing the fitting in the opening 11, and securing the nut 22, together with an intermediary washer 23 and gasket 24, tightly to the fitting, the fitting may be secured and sealed to the receptor.

To effect a watertight seal between the fitting 14 and the pipe 13, a gasket 26 is disposed in the annular cavity between the two. The gasket is fabricated of neoprene, or similar resilient material into a sleeve-like configuration with an interior surface which is provided with a plurality of spaced, annular ribs 27 directed radially inwardly, as depicted in FIG. 6. The outer surface of the gasket includes a portion 28 which is cylindrical, and a portion 29 which converges or tapers toward the lower end of the gasket. Also, the interior of the gasket tapers in diameter from the lower to upper end. The portion 29 matches and accommodates the taper 21 of the fitting 14.

The gasket 26 also is provided with an annular groove 31 of deep V cross-section in the top surface. This groove 31 receives a snap ring expander 32 which is a split ring having a top peripheral flange 33 and a tapered, V-shaped bottom portion 34, as shown in FIGS. 3 and 4. With the gasket 26 in place in the fitting 14, and the pipe 13 extending through the inner bore of the gasket, the snap ring expander is pressed down into the groove 31, with the flange 33 engaging the groove 25 inside the fitting and being retained thereby.

It may be appreciated that the forcing of the wedge-shaped portion 34 of the snap ring into the groove 31 causes both axial compression and radial expansion in the gasket. The axial compression forces the gasket down against the flange 18, sealing that interface. The radial expansion forces the gasket to seal the pipe-to-gasket interface and the gasket-to-fitting interface, completing the seal and preventing any leaks.

As shown in FIG. 7, the ring expander 32, which is formed of plastic or metal, may be fabricated as a continuous ring, with threads 36 provided on the exterior cylindrical surface. Using this embodiment, the ring 32 is threadedly engaged with the groove 31, creating the same compression and expansion which effects a permanent, watertight seal.

To complete the installation, a strainer 38 is placed over the receptor opening, with fingers 39 extending into the fitting 14 to maintain the strainer in place.

Thus it may be seen that the installation of the present invention may be effected easily and rapidly without recourse to caulking materials or special tools, by a person having no special technical training or ability. The drain installation thus formed is both permanent and leakproof.

I claim:

1. A drain connection for a pipe, comprising:
    a fitting adapted to receive a pipe therethrough, said fitting providing an annular cavity between the interior of said fitting and exterior of the portion of said pipe received therein;
    a resilient gasket of hollow, sleevelike configuration received within said annular cavity and about said portion of said pipe, said gasket including a first annular groove extending axially in one end thereof;
    ring means including a second annular groove for forcibly engaging said first annular groove and expanding said gasket to form a watertight seal between said pipe and said fitting; and retaining means disposed in said fitting for retaining said ring means in engagement with said first annular groove, said ring means including a ring having a flange for snapping engaging said second annular groove and being retained thereby.

2. The drain connection of claim 1, wherein said ring is split in an axial plane, and includes a wedgeshaped annulus at one end thereof for forcibly engaging said first annular groove.

3. The drain connection of claim 1, wherein said fitting comprises a generally cylindrical hollow body having a radially inwardly directed flange at one end defining an axial opening for receiving said portion of said pipe, and said ring means comprises a split ring having a peripheral flange for snappingly engaging said second annular groove and being retained thereby.

* * * * *